US012300416B2

(12) United States Patent
Kim et al.

(10) Patent No.: US 12,300,416 B2
(45) Date of Patent: May 13, 2025

(54) COIL COMPONENT

(71) Applicant: SAMSUNG ELECTRO-MECHANICS CO., LTD., Suwon-si (KR)

(72) Inventors: Han Kyeol Kim, Suwon-si (KR); Myoung Soon Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1021 days.

(21) Appl. No.: 17/241,346

(22) Filed: Apr. 27, 2021

(65) Prior Publication Data

US 2022/0172879 A1 Jun. 2, 2022

(30) Foreign Application Priority Data

Nov. 30, 2020 (KR) ........................ 10-2020-0164894

(51) Int. Cl.
*H01F 27/28* (2006.01)
*H01F 27/29* (2006.01)

(52) U.S. Cl.
CPC ......... *H01F 27/2804* (2013.01); *H01F 27/29* (2013.01); *H01F 2027/2809* (2013.01)

(58) Field of Classification Search
CPC ................. H01F 27/2804; H01F 27/29; H01F 2027/2809; H01F 17/0013
See application file for complete search history.

(56) References Cited

U.S. PATENT DOCUMENTS 9,142,343 B2 9/2015 Ohkubo et al.
10,141,097 B2 11/2018 Jeong et al.
2005/0068150 A1* 3/2005 Matsutani ............... H01F 17/04 336/223
2013/0341758 A1* 12/2013 Lee .......................... H10D 1/20 257/531
2014/0009254 A1* 1/2014 Ohkubo .............. H01F 17/0033 336/192
2016/0163444 A1* 6/2016 Choi ..................... H01F 41/043 336/200
(Continued)

FOREIGN PATENT DOCUMENTS

KR 10-2014-0005088 A 1/2014
KR 10-2016-0071957 A 6/2016
(Continued)

OTHER PUBLICATIONS

Korean Office Action dated Mar. 27, 2025 issued in Korean Patent Application No. 10-2020-0164894 (with English translation).

*Primary Examiner* — Malcolm Barnes
(74) *Attorney, Agent, or Firm* — Morgan, Lewis & Bockius LLP

(57) ABSTRACT

A coil component includes: a support substrate; a coil portion including a coil pattern disposed on the support substrate, lead patterns disposed on both surfaces of the support substrate and connected to the coil pattern, and a connection via penetrating through the support substrate to connect the lead patterns disposed on the both surfaces of the support substrate to each other; and a body covering the support substrate and the coil portion, wherein any one of the lead patterns disposed on the both surfaces of the support substrate has a thickness smaller than that of the coil pattern.

20 Claims, 9 Drawing Sheets

(56) References Cited

U.S. PATENT DOCUMENTS

| | | | | |
|---|---|---|---|---|
| 2016/0172102 | A1* | 6/2016 | Jeong | H01F 27/255 29/605 |
| 2016/0172103 | A1* | 6/2016 | Jeong | H01F 27/255 29/605 |
| 2018/0350509 | A1* | 12/2018 | Jung | H01F 27/292 |
| 2019/0013143 | A1* | 1/2019 | Kim | H01F 27/255 |
| 2019/0019615 | A1* | 1/2019 | Lee | H01F 27/255 |
| 2019/0244742 | A1* | 8/2019 | Song | |
| 2019/0311830 | A1* | 10/2019 | Kim | H01F 27/324 |
| 2019/0311831 | A1* | 10/2019 | Yeo | H01F 41/042 |
| 2020/0020477 | A1 | 1/2020 | Kang et al. | |
| 2020/0185142 | A1 | 6/2020 | Kim et al. | |
| 2021/0327637 | A1* | 10/2021 | Eda | H01F 17/0013 |

FOREIGN PATENT DOCUMENTS

| | | | |
|---|---|---|---|
| KR | 10-1832547 | B1 | 2/2018 |
| KR | 10-2004812 | B1 | 7/2019 |
| KR | 10-2052819 | B1 | 12/2019 |
| KR | 10-2093149 | B1 | 3/2020 |
| KR | 10-2020-0069803 | A | 6/2020 |

* cited by examiner

COIL COMPONENT

CROSS-REFERENCE TO RELATED APPLICATION(S)

This application claims benefit of priority to Korean Patent Application No. 10-2020-0164894 filed on Nov. 30, 2020 in the Korean Intellectual Property Office, the disclosure of which is incorporated herein by reference in its entirety.

TECHNICAL FIELD

The present disclosure relates to a coil component.

BACKGROUND

An inductor, a coil component, is a representative passive electronic component used in an electronic device, together with a resistor and a capacitor.

Meanwhile, a lead pattern connected to an external electrode may be formed in the coil component.

Depending on a thickness and a form of such a lead pattern, a plating bleeding defect rate, a chipping defect and the like, direct current (DC) resistance (Rdc) characteristics, and the like, may be changed.

SUMMARY

An aspect of the present disclosure may provide a coil component in which a defect rate of an electrode portion is reduced.

According to an aspect of the present disclosure, a coil component may include: a support substrate; a coil portion including a coil pattern disposed on the support substrate, lead patterns disposed on both surfaces of the support substrate and connected to the coil pattern, and a connection via penetrating through the support substrate to connect the lead patterns disposed on the both surfaces of the support substrate to each other; and a body covering the support substrate and the coil portion. Any one of the lead patterns disposed on the both surfaces of the support substrate may have a thickness lower than that of the coil pattern.

According to another aspect of the present disclosure, a coil component may include: a support substrate; a coil portion including a coil pattern and a lead pattern each disposed on the support substrate; and a body covering the support substrate and the coil portion. Each of the coil pattern and the lead pattern may include a first metal layer disposed on the support substrate and a second metal layer disposed on the first metal layer, the coil pattern may further include a third metal layer disposed on the second metal layer, and the lead pattern may have a thickness smaller than that of the coil pattern.

According to another aspect of the present disclosure, a coil component may include: a support substrate; a coil portion including a coil pattern disposed on an upper surface of the support substrate, and first and second lead patterns disposed on the upper surface of the support substrate; a body covering the support substrate and the coil portion; a first external electrode include a first pad portion disposed on a surface of the body facing a lower surface of the support substrate, and a first connection portion extending from the first pad portion and disposed on a first end surface of the body to connect to the first lead pattern exposed from the first end surface; and a second external electrode include a second pad portion disposed on the surface of the body facing the lower surface of the support substrate, and a second connection portion extending from the second pad portion and disposed on a second end surface of the body opposing the first end surface to connect to the second lead pattern exposed from the second end surface. A thickness of the first lead portion and a thickness of the second lead portion may be less than a thickness of the coil pattern.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
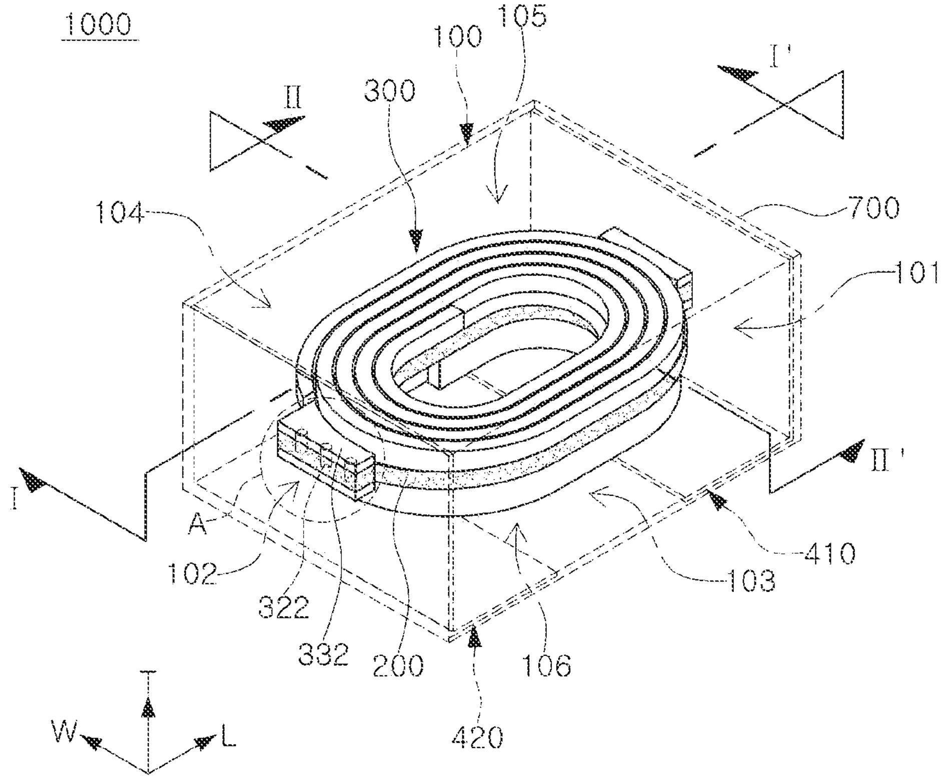
FIG. 1 is a schematic perspective view illustrating a coil component according to an exemplary embodiment in the present disclosure.

Hereinafter, exemplary embodiments of the present disclosure will be described in detail with reference to the accompanying drawings.

Further, a term "couple" not only refers to a case where respective components are in physically direct contact with each other, but also refers to a case where the respective components are in contact with another component with another component interposed therebetween, in a contact relationship between the respective components.

Since sizes and thicknesses of the respective components illustrated in the drawings are arbitrarily illustrated for convenience of explanation, the present disclosure is not necessarily limited to those illustrated in the drawings.

In the drawings, an L direction refers to a first direction or a length direction, a W direction refers to a second direction or a width direction, and a T direction refers to a third direction or a thickness direction.

Hereinafter, coil components according to exemplary embodiments in the present disclosure will be described in detail with reference to the accompanying drawings. In describing exemplary embodiments in the present disclosure with reference to the accompanying drawings, components that are the same as or correspond to each other will be denoted by the same reference numerals, and an overlapping description therefor will be omitted.

Various kinds of electronic components may be used in an electronic device, and various kinds of coil components may be appropriately used between these electronic components depending on their purposes in order to remove noise, or the like.

That is, the coil components used in the electronic device may be a power inductor, high frequency (HF) inductors, a general bead, a bead for a high frequency (GHz), a common mode filter, and the like.

Figure 2:
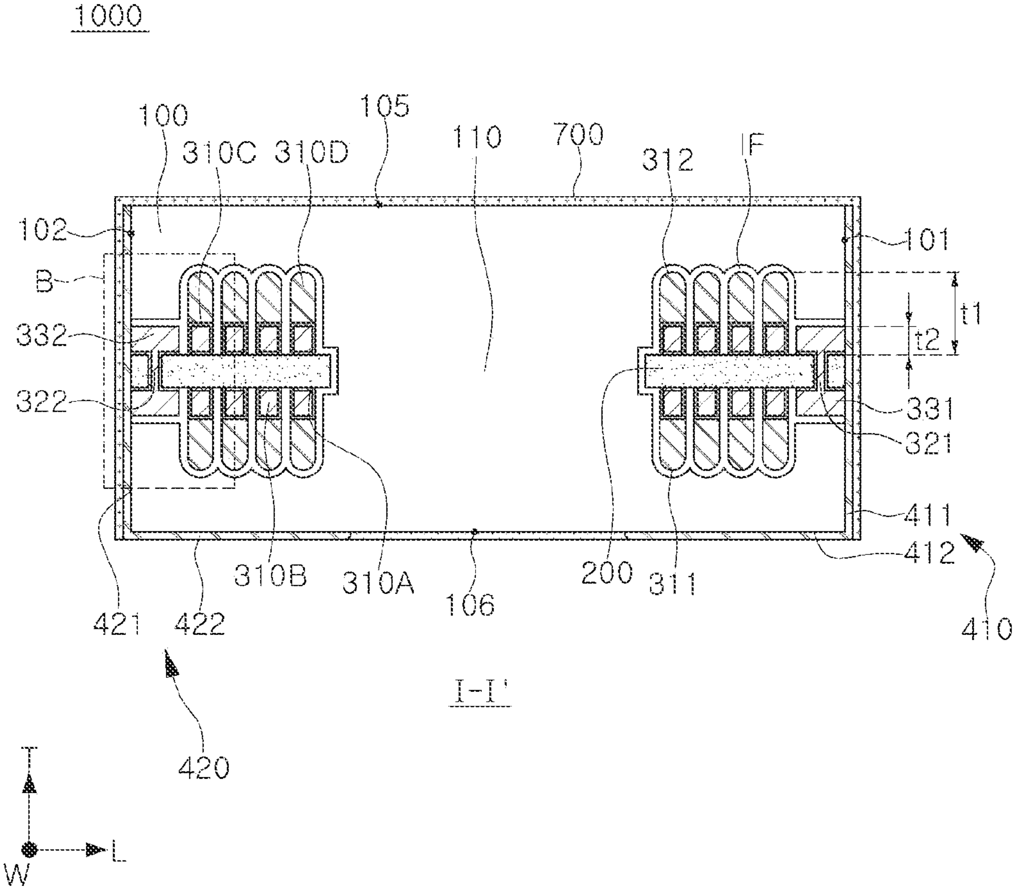
FIG. 2 is a cross-sectional view taken along line I-I' of FIG. 1.
Figure 3:
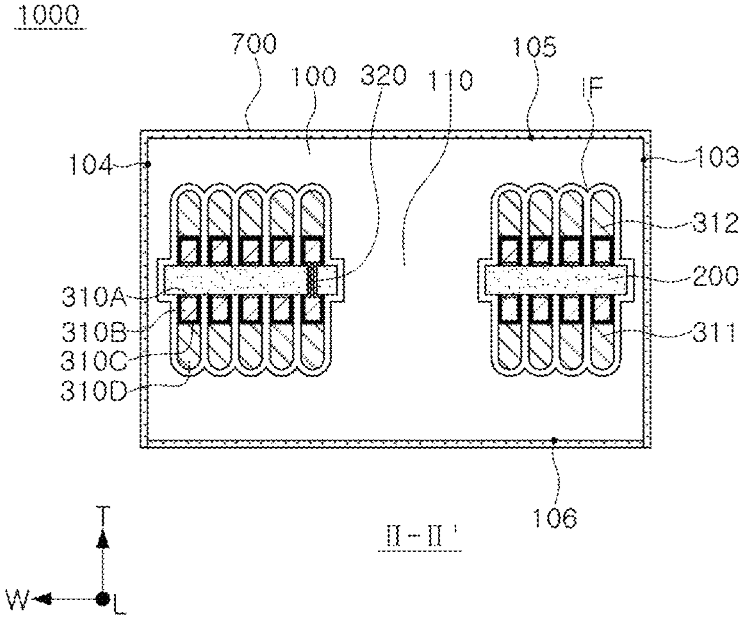
FIG. 3 is a cross-sectional view taken along line II-II' of FIG. 1.

FIG. 1 is a schematic perspective view illustrating a coil component according to an exemplary embodiment in the present disclosure. FIG. 2 is a cross-sectional view taken along line I-I' of FIG. 1. FIG. 3 is a cross-sectional view taken along line II-II' of FIG. 1.

Referring to FIGS. 1 through 3, a coil component 1000 according to an exemplary embodiment in the present disclosure may include a body 100, a support substrate 200, a coil portion 300, external electrodes 410 and 420, and a surface insulating layer 700, and may further include an insulating film IF.

The body 100 may form an appearance of the coil component 1000 according to the present exemplary embodiment, and may have the coil portion 300 and the support substrate 200 disposed therein.

The body 100 may generally have a hexahedral shape.

The body 100 may have a first surface 101 and a second surface 102 opposing each other in the length direction L, a third surface 103 and a fourth surface 104 opposing each other in the width direction W, and a fifth surface 105 and a sixth surface 106 opposing each other in the thickness direction T. The first to fourth surfaces 101, 102, 103, and 104 of the body 100 may correspond to walls of the body 100 that connect the fifth surface 105 and the sixth surface 106 of the body 100 to each other. Hereinafter, both end surfaces (one end surface and the other end surface) of the body 100 may refer to the first surface 101 and the second surface 102 of the body 100, both side surfaces (one side surface and the other side surface) of the body 100 may refer to the third surface 103 and the fourth surface 104 of the body 100, and one surface and the other surface of the body 100 may refer to the fifth surface 105 and the sixth surface 106 of the body 100, respectively.

The body 100 may be formed so that the coil component 1000 according to the present exemplary embodiment in which external electrodes 410 and 420 and a surface insulating layer 700 to be described later are formed may have a length of 2.0 mm, a width of 1.2 mm, and a thickness of 0.65 mm by way of example, but is not limited thereto. Meanwhile, the dimensions described above are merely design values that do not reflect process errors and the like, and it is thus to be considered that dimensions within ranges admitted as the processor errors fall within the scope of the present disclosure.

The length of the coil component 1000 described above may refer to a maximum length of lengths of a plurality of segments that connect between the outermost boundary lines of the coil component 1000 illustrated in an image of a cross section of the coil component 1000 in the length direction L-thickness direction T at a central portion of the coil component 1000 in the width direction W, captured by an optical microscope or a scanning electron microscope (SEM), and are parallel to the length direction L. Alternatively, the length of the coil component 1000 described above may refer to an arithmetic mean value of lengths of three or more of a plurality of segments that connect between the outermost boundary lines of the coil component 1000 illustrated in the image of the cross section and are parallel to the length direction L.

The thickness of the coil component 1000 described above may refer to a maximum length of lengths of a plurality of segments that connect between the outermost boundary lines of the coil component 1000 illustrated in an image of a cross section of the coil component 1000 in the length direction L-thickness direction T at a central portion of the coil component 1000 in the width direction W, captured by an optical microscope or an SEM, and are parallel to the thickness direction T. Alternatively, the thickness of the coil component 1000 described above may refer to an arithmetic mean value of lengths of three or more of a plurality of segments that connect between the outermost boundary lines of the coil component 1000 illustrated in the image of the cross section and are parallel to the length thickness T.

The width of the coil component 1000 described above may refer to a maximum length of lengths of a plurality of segments that connect between the outermost boundary lines of the coil component 1000 illustrated in an image of a cross section of the coil component 1000 in the length direction L-width direction W at a central portion of the coil component 1000 in the thickness direction T, captured by an optical microscope or an SEM, and are parallel to the width direction W. Alternatively, the width of the coil component 1000 described above may refer to an arithmetic mean value of lengths of three or more of a plurality of segments that connect between the outermost boundary lines of the coil component 1000 illustrated in the image of the cross section and are parallel to the width thickness W.

Alternatively, each of the length, the width, and the thickness of the coil component 1000 may be measured by a micrometer measurement method. In the micrometer measurement method, each of the length, the width, and the thickness of the coil component 1000 may be measured by setting a zero point with a gage repeatability and reproducibility (R&R) micrometer, inserting the coil component 1000 according to the present example embodiment between tips of the gage R&R micrometer, and turning a measuring lever of the gage R&R micrometer. Meanwhile, in measuring the length of the coil component 1000 by the micrometer measurement method, the length of the coil component 1000 may refer to a value measured once or may refer to an arithmetic mean of values measured plural times. This may also be similarly applied to the width and the thickness of the coil component 1000.

The body 100 may include an insulating resin and a magnetic material. Specifically, the body 100 may be formed by stacking one or more magnetic composite sheets in which the magnetic materials are dispersed in the insulating resin. The magnetic material may be ferrite or metal magnetic powder particles.

The ferrite may be, for example, one or more of spinel type ferrites such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrites such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, and Li-based ferrite.

The metal magnetic powder particles may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder particles may be one or more of pure iron powder particles, Fe—Si-based alloy powder particles, Fe—Si—Al-based alloy powder particles, Fe—Ni-based alloy powder particles, Fe—Ni—Mo-based alloy powder particles, Fe—Ni—Mo—Cu-based alloy powder particles, Fe—Co-based alloy powder particles, Fe—Ni—Co-based alloy powder particles, Fe—Cr-based alloy powder particles, Fe—Cr—Si-based alloy powder particles, Fe—Si—Cu—Nb-based alloy powder particles, Fe—Ni—Cr-based alloy powder particles, and Fe—Cr—Al-based alloy powder particles.

The metal magnetic powder particles may be amorphous or crystalline. For example, the metal magnetic powder particles may be Fe—Si—B—Cr based amorphous alloy powder particles, but are not necessarily limited thereto.

The ferrite and the metal magnetic powder particles may have average diameters of about 0.1 μm to 30 μm, respectively, but are not limited thereto.

The body 100 may include two kinds or more of magnetic materials dispersed in the resin. Here, different kinds of magnetic materials mean that the magnetic materials dispersed in the resin are distinguished from each other by any one of an average diameter, a composition, crystallinity, and a shape.

Meanwhile, a description will hereinafter be provided on the assumption that the magnetic material is the magnetic metal powder, but the scope of the present disclosure is not limited to the body 100 having a structure in which the magnetic metal powder particles are dispersed in the insulating resin.

The insulating resin may include epoxy, polyimide, liquid crystal polymer (LCP), or the like, or mixtures thereof, but is not limited thereto.

The body 100 may include a core 110 penetrating through a support substrate 200 and a coil portion 300 to be described later. The core 110 may be formed by filling a through-hole penetrating through a central portion of each of the coil portion 300 and the support substrate 200 with the magnetic composite sheets, but is not limited thereto.

The support substrate 200 may be buried in the body 100. The support substrate 200 may be configured to support a coil portion 300 to be described later.

The support substrate 200 may be formed of an insulating material including a thermosetting resin such as an epoxy resin, a thermoplastic resin such as a polyimide resin, or a photosensitive insulating resin or be formed of an insulating material having a reinforcement material such as a glass fiber or an inorganic filler impregnated in such an insulating resin. As an example, the support substrate 200 may be formed of an insulating material such as prepreg, an Ajinomoto Build-up Film (ABF), FR-4, a Bismaleimide Triazine (BT) resin, or a photoimagable dielectric (PID), but is not limited thereto.

As the inorganic filler, one or more materials selected from the group consisting of silica ($SiO_2$), alumina ($Al_2O_3$), silicon carbide (SiC), barium sulfate ($BaSO_4$), talc, clay, mica powder particles, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the support substrate 200 is formed of the insulating material including the reinforcing material, the support substrate 200 may provide more excellent rigidity. When the support substrate 200 is formed of an insulating material that does not include the glass fiber, it may be advantageous in decreasing a thickness of the coil component 1000 according to the present exemplary embodiment. In addition, a volume occupied by the coil portion 300 and/or the magnetic metal powder particles may be increased on the basis of the body 100 having the same size, such that component characteristics may be improved. When the support substrate 200 is formed of an insulating material including the photosensitive insulating resin, the number of processes for forming the coil portion 300 may be decreased, which is advantageous in reducing a production cost, and fine vias 320 or connection vias 321 and 322 may be formed.

The coil portion 300 may be disposed in the body 100, and may implement characteristics of the coil component 1000. For example, when the coil component 1000 according to the present exemplary embodiment is used as a power inductor, the coil portion 300 may serve to store an electric field as a magnetic field to maintain an output voltage, resulting in stabilization of power of an electronic device.

The coil portion 300 may include coil patterns 311 and 312, a via 320, lead patterns 331 and 332, and connection vias 321 and 322.

Specifically, a first coil pattern 311 and a first lead pattern 331 may be disposed on a lower surface of the support substrate 200 facing the sixth surface 106 of the body 100, and a second coil pattern 312 and a second lead pattern 332 may be disposed on an upper surface of the support substrate 200 opposing the lower surface of the support substrate 200. The via 320 may penetrate through the support substrate 200 and be in contact with and connected to inner end portions of each of the first coil pattern 311 and the second coil pattern 312. The connection vias 321 and 322 may penetrate through the support substrate 200, be exposed to one end surface 101 or the other end surface 102 of the body 100, and be connected, respectively, to the lead patterns 331 and 332 positioned on both surfaces of the support substrate 200.

The first and second lead patterns 331 and 332 may be connected to the first and second coil patterns 311 and 312, be exposed to the first and second surfaces 101 and 102 of the body 100, respectively, and be connected to external electrodes 410 and 420 to be described later, respectively. In such a manner, the coil portion 300 may function as a single coil as a whole between the first and second external electrodes 410 and 420.

Inner end portions of each of the first coil pattern 311 and the second coil pattern 312 may be may be in contact with and connected to each other.

Each of the first coil pattern 311 and the second coil pattern 312 may have a planar spiral shape in which at least one turn is formed around the core 110. As an example, the first coil pattern 311 may have at least one turn formed around the core 110 on the lower surface of the support substrate 200.

The lead patterns 331 and 332 may be exposed to the first and second surfaces 101 and 102 of the body 100, respectively. The first lead patterns 331 may be disposed on both surfaces of the support substrate 200 and be exposed to the first surface 101 of the body 100. Specifically, the first lead pattern 331 disposed on the lower surface of the support substrate 200 may be in contact with and connected to the first coil pattern 311, and the first lead pattern 331 disposed on the upper surface of the support substrate 200 may be disposed at a position corresponding to the first lead pattern 331 disposed on the lower surface of the support substrate 200 and be disposed to be spaced apart from the second coil pattern 312. The second lead patterns 332 may be disposed on both surfaces of the support substrate 200 and be exposed to the second surface 102 of the body 100. Specifically, the second lead pattern 332 disposed on the upper surface of the support substrate 200 may be in contact with and connected to the second coil pattern 312, and the second lead pattern 332 disposed on the lower surface of the support substrate 200 may be disposed at a position corresponding to the second lead pattern 332 disposed on the upper surface of the support substrate 200 and be disposed to be spaced apart from the first coil pattern 311.

The connection vias 321 and 322 may be disposed alone or in plural, and may penetrate through the support substrate

200 to connect the lead patterns 331 and 332 on both surfaces of the support substrate 200 to each other, respectively.

More specifically, a first connection via 321 may connect the first lead patterns 331 disposed on both surfaces of the support substrate 200 to each other, and a second connection via 322 may connect the second lead patterns 332 disposed on both surfaces of the support substrate 200 to each other.

Through such a disposition, the lead patterns 331 and 332 may be formed to have a small thickness, such that a magnetic material filling space inside the body 100 may be increased to improve inductance (Ls) characteristics. In addition, a depth margin in a slit dicing process and a thickness margin of a cover, a region disposed on the lead patterns 331 and 332 in the body 100, may be secured, such that plating bleeding and chipping defects may be reduced.

Furthermore, in order to suppress an increase in a direct current resistance (Rdc), which is a problem occurring when the lead patterns 331 and 332 are formed at a small thickness, the lead patterns 331 and 332 may be configured to be disposed on both surfaces of the support substrate 200 by using the connection vias 321 and 322. In this case, entire areas of the lead patterns 331 and 332 may be maintained, such that the increase in the direct current resistance (Rdc) may be prevented, and contact areas between the lead patterns 331 and 332 and the external electrodes 410 and 420 may be increased, such that contact reliability may be improved.

Each of the coil patterns 311 and 312, the via 320, the lead patterns 331 and 332, and the connection vias 321 and 322 may be formed of a conductive material such as copper (Cu), aluminum (Al), silver (Ag), tin (Sn), gold (Au), nickel (Ni), lead (Pb), titanium (Ti), chromium (Cr) or alloys thereof, but is not limited thereto.

At least one of the coil patterns 311 and 312, the via 320, the lead patterns 331 and 332, and the connection vias 321 and 322 may include at least one conductive layer.

As an example, when the second coil pattern 312, the via 320, the second lead pattern 332, and the second connection via 322 are formed by plating on the upper surface of the support substrate 200, each of the second coil pattern 312, the via 320, the second lead pattern 332, and the second connection via 322 may include a seed layer and an electroplating layer. Here, the electroplating layer may have a single-layer structure or have a multilayer structure. The electroplating layer having the multilayer structure may be formed in a conformal film structure in which another electroplating layer is formed along a surface of anyone electroplating layer or be formed in a shape in which another electroplating layer is stacked on only one surface of any one electroplating layer. The seed layer may be formed by a vapor deposition method or the like such as an electroless plating method or a sputtering method. The seed layers of each of the second coil pattern 312, the via 320, the second lead pattern 332, and the second connection via 322 may be formed integrally with each other, such that boundaries therebetween may not be formed, but are not limited thereto. The electroplating layers of each of the second coil pattern 312, the via 320, the second lead pattern 332, and the second connection via 322 may be formed integrally with each other, such that boundaries therebetween may not be formed, but are not limited thereto.

As another example, when the first coil pattern 311 and the first lead pattern 331 disposed on the lower surface of the support substrate 200 and the second coil pattern 312 and the second lead pattern 332 disposed on the upper surface of the support substrate 200 are formed separately from each other and are then collectively stacked beneath and on the support substrate 200, respectively, to form the coil portion 300, the via 320 may include a high melting point metal layer and a low melting point metal layer having a melting point lower than that of the high melting point metal layer. Here, the low melting point metal layer may be formed of a solder including lead (Pb) and/or tin (Sn). At least a portion of the low melting point metal layer may be melted due to a pressure and a temperature at the time of the collective stacking, such that, for example, an inter-metallic compound (IMC) layer may be formed on a boundary between the low melting point metal layer and the second coil pattern 312.

In the present exemplary embodiment, a thickness t2 of the lead patterns 331 and 332 may be lower than a thickness t1 of the coil patterns 311 and 312.

The thickness of the lead patterns 331 and 332 may refer to a maximum length of lengths of a plurality of segments that connect between the outermost boundary lines of the lead patterns 331 and 332 in the thickness direction T and surfaces of the support substrate 200 illustrated in an image of a cross section of the coil component 1000 in the length direction L-thickness direction T in a central portion of the coil component 1000 in the width direction W, captured by an optical microscope or an SEM, and are parallel to the thickness direction T. Alternatively, the thickness of the lead patterns 331 and 332 may refer to a minimum length of lengths of a plurality of segments that connect between the outermost boundary lines of the lead patterns 331 and 332 in the thickness direction T and surfaces of the support substrate 200 illustrated in the image of the cross section and are parallel to the thickness direction T. Alternatively, the thickness of the lead patterns 331 and 332 may refer to an arithmetic mean value of lengths of at least two of a plurality of segments that connect between the outermost boundary lines of the lead patterns 331 and 332 in the thickness direction T and surfaces of the support substrate 200 illustrated in the image of the cross section and are parallel to the thickness direction T.

Here, the thickness of the first coil pattern 311 may refer to a maximum length of lengths of a plurality of segments that connect between two outermost boundary lines, facing each other in the thickness direction T, of any one of a plurality of turns of the first coil pattern 311 illustrated in an image of a cross section of the coil component 1000 in the length direction L-thickness direction T at a central portion of the coil component 1000 in the width direction W, captured by an optical microscope or an SEM and are parallel to the thickness direction T. Alternatively, the thickness of the first coil pattern 311 may refer to a minimum length of lengths of a plurality of segments that connect between two outermost boundary lines, facing each other in the thickness direction T, of any one of a plurality of turns of the first coil pattern 311 illustrated in the image of the cross section and are parallel to the thickness direction T. Alternatively, the thickness of the first coil pattern 311 may refer to an arithmetic mean value of lengths of at least two of a plurality of segments that connect between two outermost boundary lines, facing each other in the thickness direction T, of any one of a plurality of turns of the first coil pattern 311 illustrated in the image of the cross section and are parallel to the thickness direction T. The description for the thickness of the first coil pattern 311 may also be similarly applied to the thickness of the second coil pattern 312.

As such, the lead patterns 331 and 332 may be formed at a thickness smaller than that of the coil patterns 311 and 312. Therefore, as described above, the magnetic material filling space inside the body 100 may be increased to improve an Ls characteristic value, and the depth margin in the slit dicing process and the thickness margin of the cover of the lead patterns 331 and 332 in the body 100 may be secured, such that plating bleeding and a chipping defect may be reduced.

Here, a plurality of metal layers 310A, 310B, 310C, and 310D may be formed in a sequential plating process in order to form a difference in thickness between the lead patterns 331 and 332 and the coil patterns 311 and 312.

The external electrodes 410 and 420 may be disposed on the body 100 so as to be spaced apart from each other, and may be connected to the coil portion 300. In the present exemplary embodiment, the external electrodes 410 and 420 may include, respectively, pad portions 412 and 422 disposed on the sixth surface 106 of the body 100 so as to be spaced apart from each other and connection portions 411 and 421 disposed, respectively, on the first and second surfaces 101 and 102 of the body 100. Specifically, the first external electrode 410 may include a first connection portion 411 disposed on the first surface 101 of the body 100 to be in contact with the first lead pattern 331 exposed to the first surface 101 of the body 100 and a first pad portion 412 extending from the first connection portion 411 to the sixth surface 106 of the body 100. The second external electrode 420 may include a second connection portion 421 disposed on the second surface 102 of the body 100 to be in contact with the second lead pattern 332 exposed to the second surface 102 of the body 100 and a second pad portion 422 extending from the second connection portion 421 to the sixth surface 106 of the body 100. The first and second pad portions 412 and 422 may be disposed on the sixth surface 106 of the body 100 so as to be spaced apart from each other. The connection portions 411 and 412 and the pad portions 412 and 422 may be formed together and integrally with each other in the same process, such that boundaries therebetween are not formed, but are not limited thereto.

The external electrodes 410 and 420 may be formed by a vapor deposition method such as sputtering and/or a plating method, but is not limited thereto.

The external electrodes 410 and 420 may be formed of a conductive material such as copper (Cu), aluminum (Al), silver (Ag), tin (Sn), gold (Au), nickel (Ni), lead (Pb), chromium (Cr), titanium (Ti), or alloys thereof, but are not limited thereto. The external electrodes 410 and 420 may be formed in a single layer structure or a multilayer structure. As an example, the first external electrode 410 may include a first conductive layer including copper (Cu), a second conductive layer disposed on the first conductive layer and including nickel (Ni), and a third conductive layer disposed on the second conductive layer and including tin (Sn). At least one of the second conductive layer and the third conductive layer may be formed to cover the first conductive layer, but is not limited thereto. At least one of the second conductive layer and the third conductive layer may be disposed only on the sixth surface 106 of the body 100, but is not limited thereto. The first conductive layer may be a plating layer or be a conductive resin layer formed by applying and then hardening a conductive resin including conductive powder particles including at least one copper (Cu) and silver (Ag) and a resin. The second and third conductive layers may be plating layers, but are not limited thereto.

The insulating film IF may be disposed between the coil portion 300 and the body 100 and between the support substrate 200 and the body 100. The insulating film IF may be formed along the surfaces of the support substrate 200 on which the coil patterns 311 and 312 and the lead patterns 331 and 332 are formed, but is not limited thereto. The insulating film IF may be provided in order to insulate the coil portion 300 and the body 100 from each other, and may include a known insulating material such as parylene, but is not limited thereto. As another example, the insulating film IF may include an insulating material such as an epoxy resin rather than parylene. The insulating film IF may be formed by a vapor deposition method, but is not limited thereto. As another example, the insulating film IF may be formed by stacking and then hardening an insulation film for forming the insulating film IF on both surfaces of the support substrate 200 on which the coil portion 300 is formed or may be formed by applying and then hardening an insulation paste for forming the insulating film IF onto both surfaces of the support substrate 200 on which the coil portion 300 is formed. Meanwhile, for the reason described above, the insulating film IF may be omitted in the present exemplary embodiment. That is, when the body 100 has sufficient electrical resistance at a designed operating current and voltage of the coil component 1000 according to the present exemplary embodiment, the insulating film IF may be omitted in the present exemplary embodiment.

The coil component 1000 according to the present exemplary embodiment may further include the surface insulating layer 700 disposed on the fifth surface 105 of the body 100.

The surface insulating layer 700 may extend from the fifth surface 105 of the body 100 to at least portions of the first to fourth and sixth surfaces 101, 102, 103, 104, and 106. In the present exemplary embodiment, the surface insulating layer 700 may be disposed on each of the first to fifth surfaces 101, 102, 103, 104, and 105 of the body 100, and may be disposed on a region of the sixth surface 106 of the body 100 except for a region in which the pad portions 412 and 422 are disposed. The surface insulating layer 700 disposed on the first and second surfaces 101 and 102 of the body 100 may cover the connection portions 411 and 412 of the external electrodes 410 and 420.

At least portions of the surface insulating layer 700 disposed on each of the first to sixth surfaces 101, 102, 103, 104, 105, and 106 of the body 100 may be formed integrally with each other in the same process, such that boundaries therebetween are not formed, but are not limited thereto.

The surface insulating layer 700 may include a thermoplastic resin such as polystyrenes, vinyl acetates, polyesters, polyethylenes, polypropylenes, polyamides, rubbers, or acryls, a thermosetting resin such as phenols, epoxies, urethanes, melamines, or alkyds, a photosensitive resin, parylene, $SiO_x$, or $SiN_x$. The surface insulating layer 700 may include an insulating filler such as an inorganic filler, but is not limited thereto.

Figure 4:
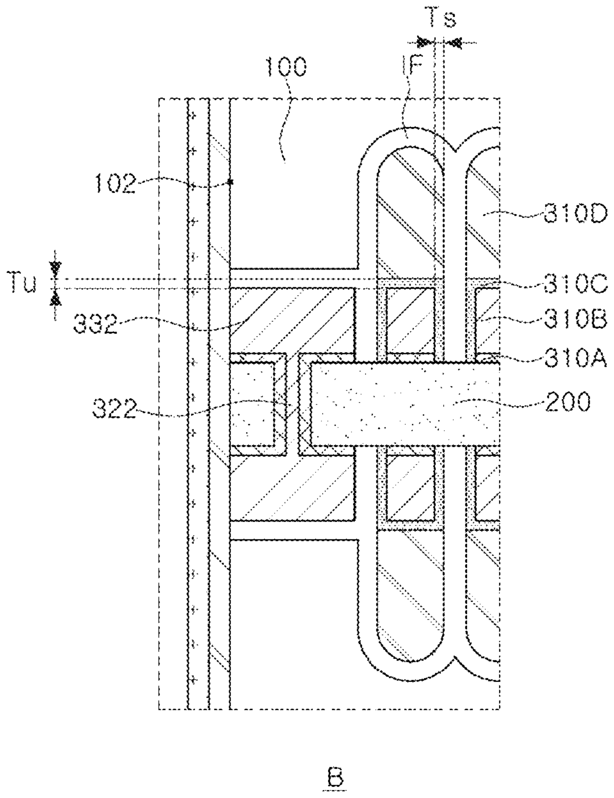
FIG. 4 is an enlarged view illustrating region B of FIG. 2.

FIG. 4 is an enlarged view illustrating region B of FIG. 2.

Referring to FIG. 4, the connection via 322 penetrating through the support substrate 200 and connecting the lead patterns 332 disposed on both surfaces of the support substrate 200 to each other may be formed.

The connection via 322 may be formed by sequentially performing a hole forming process using a mechanical drill, a chemical copper plating process, and a pattern plating process on a copper clad laminate (CCL). In this case, the connection via 322 may have a linear shape as illustrated in FIG. 4. However, when the CCL is processed with $CO_2$ laser, a shape of the connection via 322 may be changed depending on a thickness of the CCL.

First, a first metal layer 310A included in common in the coil patterns 311 and 312 and the lead pattern 331 and 332 may be formed by performing $CO_2$ laser processing on the CCL and then performing a chemical copper plating process. Here, the first metal layer 310A may include copper (Cu).

Second, a second metal layer 310B included in common in the coil patterns 311 and 312 and the lead pattern 331 and 332 may be formed through a pattern plating process. In this case, as a result of pattern plating, the second metal layer 310B may expose a side surface of the first metal layer 310A, and be spaced apart from the support substrate 200.

Electrode structures having the lead pattern 332 may be formed on both surfaces of the support substrate 200.

Third, a third metal layer 310C may be formed in the coil pattern 311 by performing a masking work on the lead pattern 332 and then performing a lead-in wire plating process. Here, as an example, the third metal layer 310C may be an isotropic plating layer, and resultantly, a length Tu of a region of the third metal layer 310C disposed on an upper surface of the second metal layer 310B and a length Ts of a region of the third metal layer 310C disposed on a side surface of the second metal layer 310B may be the same as each other. As another example, the third metal layer 310C may be an anisotropic plating layer, and resultantly, a length of a region of the third metal layer 310C disposed on an upper surface of the second metal layer 310B may be significantly greater than that of a region of the third metal layer 310C disposed on a side surface of the second metal layer 310B.

Finally, a fourth metal layer 310D may be formed in the coil pattern 311 through an anisotropic plating process. Here, as an example, the fourth metal layer 310D may be an anisotropic plating layer, and resultantly, a length of a region of the fourth metal layer 310D disposed on an upper surface of the third metal layer 310C may be greater than that of a region of the fourth metal layer 310D disposed on a side surface of the third metal layer 310C.

As a result, the coil pattern 311 may further include the third metal layer 310C and/or the fourth metal layer 310D as compared with the lead pattern 332, and a thickness of the coil pattern 311 may thus be greater than that of the lead pattern 332.

Figure 5:
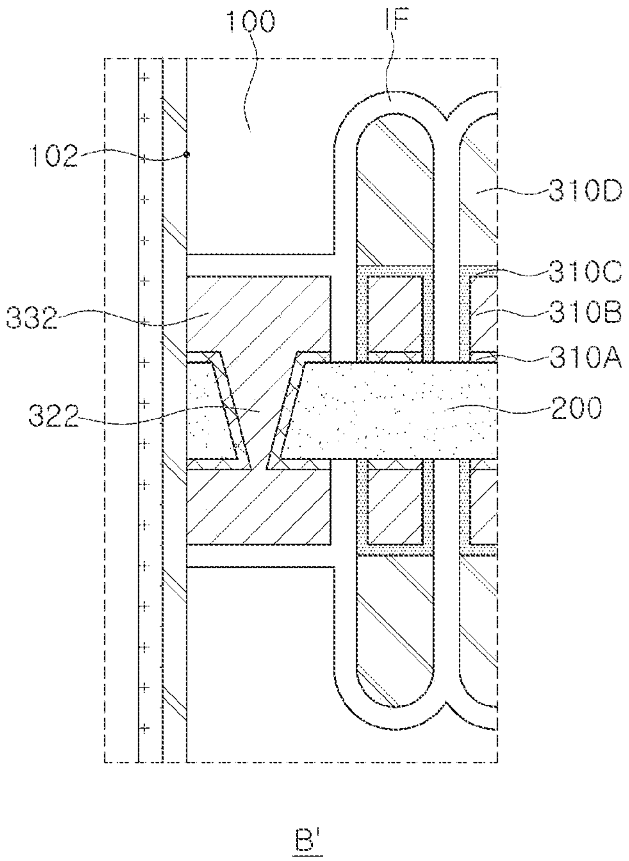
FIG. 5 is an enlarged view illustrating portion B' corresponding to region B of FIG. 2.

FIG. 5 is an enlarged view illustrating portion B' corresponding to region B of FIG. 2.

Referring to FIG. 5, the connection via 322 penetrating through the support substrate 200 and connecting the lead patterns 332 disposed on both surfaces of the support substrate 200 to each other may be formed, and the connection via 322 may have a tapered shape in which an area of a penetration surface becomes gradually narrower on the basis of a surface irradiated with laser in a process of performing $CO_2$ laser processing on the CCL.

Figure 6:
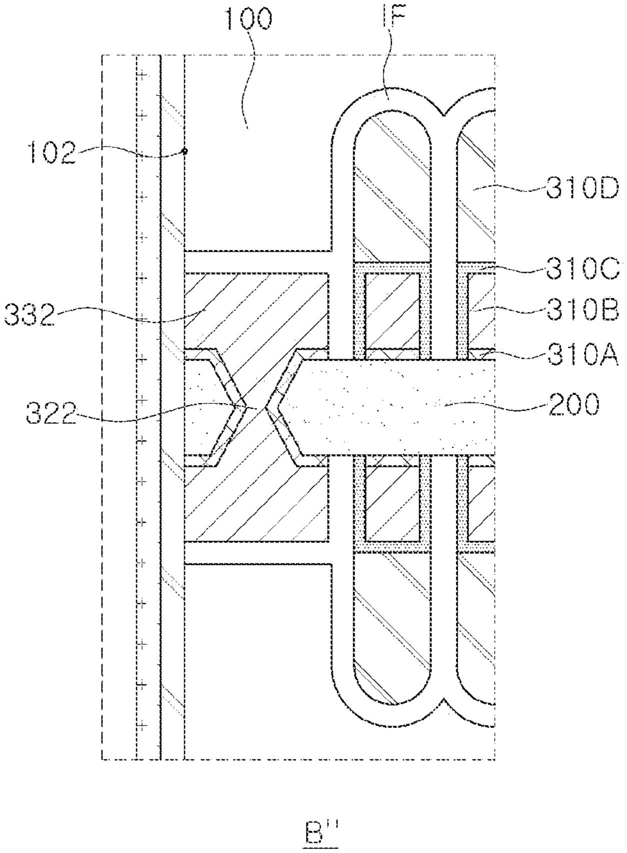
FIG. 6 is an enlarged view illustrating portion B" corresponding to region B of FIG. 2.

FIG. 6 is an enlarged view illustrating portion B" corresponding to region B of FIG. 2.

Referring to FIG. 6, the connection via 322 penetrating through the support substrate 200 and connecting the lead patterns 332 disposed on both surfaces of the support substrate 200 to each other may be formed, and both surface of the CCL may be irradiated with laser when the CCL has a great thickness in a process of performing $CO_2$ laser processing on the CCL. In this case, the connection via 322 may have an hourglass shape in which an area of a penetration surface becomes gradually narrower and then wider from a top surface to a bottom surface.

Figure 7:
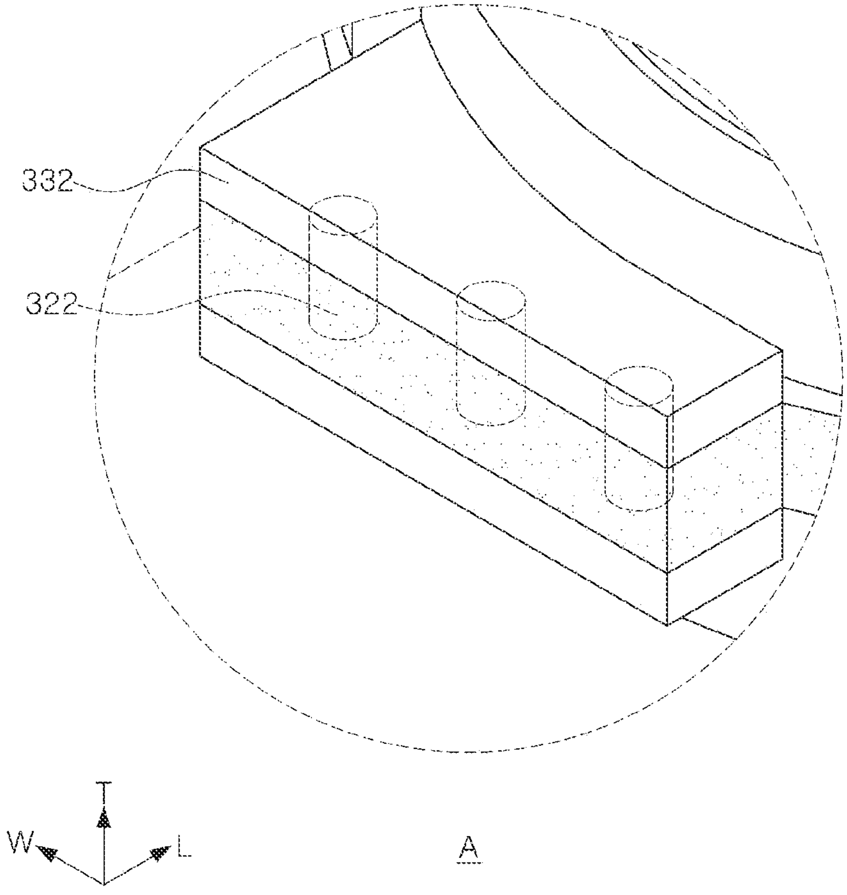
FIG. 7 is an enlarged view illustrating region A of FIG. 1.

FIG. 7 is an enlarged view illustrating region A of FIG. 1.

Referring to FIG. 7, a plurality of connection vias 322 may be formed for one lead pattern 332.

In the present exemplary embodiment, the connection vias 322 may be disposed to be spaced apart from each other in the width direction W on the basis of the body 100.

Figure 8:
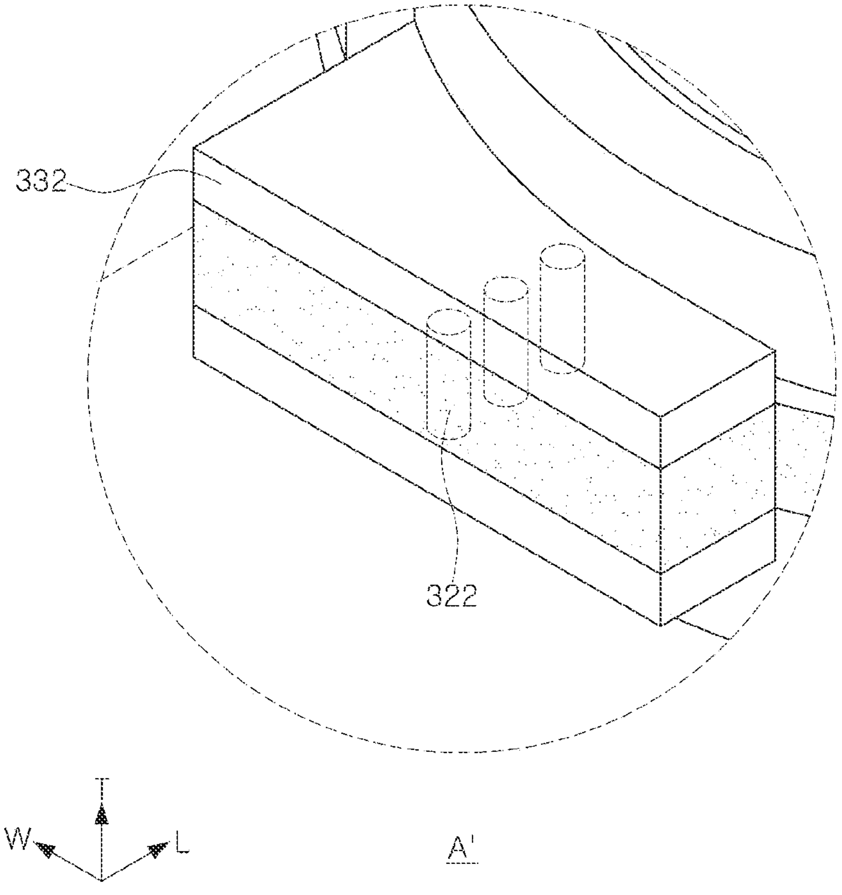
FIG. 8 is an enlarged view illustrating portion A' corresponding to region A of FIG. 1.

FIG. 8 is an enlarged view illustrating portion A' corresponding to region A of FIG. 1.

Referring to FIG. 8, a plurality of connection vias 322 may be formed for one lead pattern 332.

In the present exemplary embodiment, the connection vias 322 may be disposed to be spaced apart from each other in the length direction L on the basis of the body 100.

Figure 9:
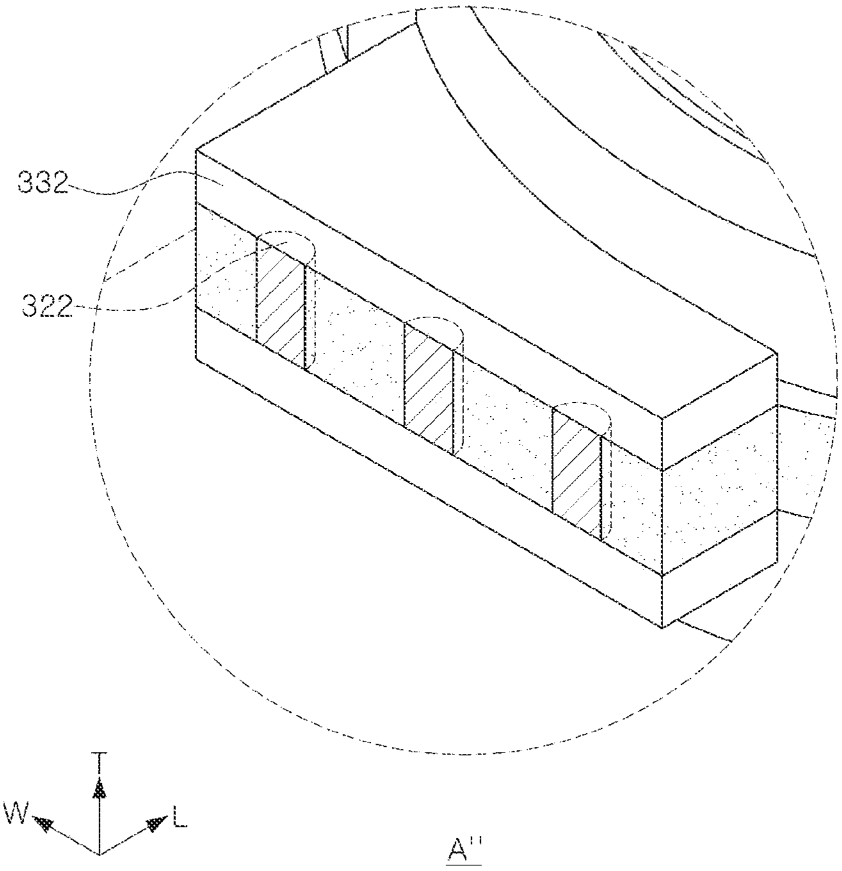
FIG. 9 is an enlarged view illustrating portion A" corresponding to region A of FIG. 1.

FIG. 9 is an enlarged view illustrating portion A" corresponding to region A of FIG. 1.

Referring to FIG. 9, a plurality of connection vias 322 may be formed for one lead pattern 332.

In the present exemplary embodiment, the connection vias 322 may be disposed to be spaced apart from each other in the width direction W on the basis of the body 100.

In addition, the connection vias 322 may be exposed to the second surface 102 of the body 100. In this case, a contact area between the lead pattern 332 and the external electrode may further be increased, such that an effect that contact reliability is improved or direct current resistance (Rdc) characteristics are improved may be expected.

As set forth above, according to exemplary embodiments in the present disclosure, a coil component in which defect rates of plating bleeding, a chipping defect and the like of an electrode portion are reduced, and direct current resistance (Rdc) characteristics and the like are improved may be provided.

While exemplary embodiments have been shown and described above, it will be apparent to those skilled in the art that modifications and variations could be made without departing from the scope of the present invention as defined by the appended claims.

What is claimed is:

1. A coil component comprising:

a support substrate;

a coil portion including a coil pattern disposed on the support substrate, lead patterns disposed on both surfaces of the support substrate and connected to the coil pattern, and a connection via penetrating through the support substrate to connect the lead patterns disposed on the both surfaces of the support substrate to each other; and a body covering the support substrate and the coil portion, wherein any one of a portion of the lead patterns, exposed from the body and disposed on the both surfaces of the support substrate, has a thickness smaller than a thickness of an outmost turn of the coil pattern.

2. The coil component of claim 1, wherein the body has one surface and the other surface opposing each other, one end surface and the other end surface each connecting to the one surface and the other surface of the body to each other and opposing each other in a length direction of the body, and one side surface and the other side surface each connecting the one end surface and the other end surface of the body to each other and opposing each other in a width direction of the body, and a plurality of connection vias spaced apart from each other are disposed in the support substrate.

3. The coil component of claim 2, wherein the plurality of connection vias are disposed to be spaced apart from each other in the width direction.

4. The coil component of claim 2, wherein the plurality of connection vias are disposed to be spaced apart from each other in the length direction.

5. The coil component of claim 2, wherein the plurality of connection vias are exposed to one of the one end surface and the other end surface of the body.

6. The coil component of claim 1, wherein each of the coil pattern and the lead pattern includes a first metal layer disposed on the support substrate and a second metal layer disposed on the first metal layer, and the coil pattern further includes a third metal layer disposed on the second metal layer.

7. The coil component of claim 6, wherein the first metal layer includes copper (Cu).

8. The coil component of claim 6, wherein the second metal layer exposes a side surface of the first metal layer, and is spaced apart from the support substrate.

9. The coil component of claim 6, wherein the third metal layer covers a side surface of each of the first and second metal layers to be in contact with the support substrate.

10. The coil component of claim 9, wherein a length of a region of the third metal layer disposed on an upper surface of the second metal layer and a length of a region of the third metal layer disposed on the side surface of the second metal layer are the same as each other.

11. The coil component of claim 6, wherein the coil pattern includes a fourth metal layer disposed on an upper surface of the third metal layer.

12. The coil component of claim 1, further comprising first and second external electrodes disposed on the body so as to be spaced apart from each other and each connected to the coil portion.

13. A coil component comprising:

a support substrate;

a coil portion including a coil pattern and a lead pattern each disposed on the support substrate; and a body covering the support substrate and the coil portion, wherein each of the coil pattern and the lead pattern includes a first metal layer disposed on the support substrate and a second metal layer disposed on the first metal layer, the coil pattern further includes a third metal layer disposed on the second metal layer, and a portion of the lead pattern exposed from the body has a thickness smaller than a thickness of an outmost turn of the coil pattern.

14. The coil component of claim 13, further comprising a plurality of connection vias spaced apart from each other and disposed in the support substrate to connect to the lead pattern.

15. The coil component of claim 14, wherein the plurality of connection vias are exposed to a surface of the body.

16. A coil component comprising:

a support substrate;

a coil portion including a coil pattern disposed on an upper surface of the support substrate, and first and second lead patterns disposed on the upper surface of the support substrate;

a body covering the support substrate and the coil portion;

a first external electrode include a first pad portion disposed on a surface of the body facing a lower surface of the support substrate, and a first connection portion extending from the first pad portion and disposed on a first end surface of the body to connect to the first lead pattern exposed from the first end surface; and a second external electrode include a second pad portion disposed on the surface of the body facing the lower surface of the support substrate, and a second connection portion extending from the second pad portion and disposed on a second end surface of the body opposing the first end surface to connect to the second lead pattern exposed from the second end surface, wherein a thickness of a portion of the first lead portion exposed from the body and a thickness of a portion of the second lead portion exposed from the body are less than a thickness of an outmost turn of the coil pattern.

17. The coil component of claim 16, wherein the coil portion further comprises another coil pattern disposed on the lower surface of the support substrate, and third and fourth lead patterns disposed on the lower surface of the support substrate, and a thickness of the third lead pattern and a thickness of the fourth lead pattern are less than a thickness of the another coil pattern.

18. The coil component of claim 17, further comprising:

first connection vias penetrating through the support substrate to connect the first and third lead patterns to each other; and second connection vias penetrating through the support substrate to connect the second and fourth lead patterns to each other.

19. The coil component of claim 18, wherein the first connection vias are spaced apart from the first end surface, and the second connection vias are spaced apart from the second end surface.

20. The coil component of claim 18, wherein the first connection vias are exposed from the first end surface, and the second connection vias are exposed from the second end surface.

* * * * *